(12) United States Patent
Tanaka et al.

(10) Patent No.: US 6,759,111 B2
(45) Date of Patent: Jul. 6, 2004

(54) MAGNETIC DISK WITH EMBOSSED PATTERN

(75) Inventors: Shoji Tanaka, Kanagawa (JP); Kazuya Suzuki, Kanagawa (JP); Takeshi Sasa, Miyagi (JP); Takehisa Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 54 days.

(21) Appl. No.: 10/189,894

(22) Filed: Jul. 3, 2002

(65) Prior Publication Data

US 2003/0022006 A1 Jan. 30, 2003

(30) Foreign Application Priority Data

Jul. 9, 2001 (JP) .................................... P2001-207611

(51) Int. Cl.[7] ................................................ G11B 5/82
(52) U.S. Cl. ............... 428/65.3; 428/167; 428/694 TR; 428/694 SG; 360/75
(58) Field of Search ................................ 428/65.3, 167, 428/694 TR, 694 SG; 360/75

(56) References Cited

U.S. PATENT DOCUMENTS 6,084,731 A * 7/2000 Uchida et al. ................ 360/48

FOREIGN PATENT DOCUMENTS

JP 03228219 A * 10/1991

OTHER PUBLICATIONS

Tanaka et al; "Characterization of magnetizing process for pre–embossed servo pattern of plastic hard disks", IEEE Transactions on Magnetics vol. 30, No 6, Nov. 1994.*

* cited by examiner

Primary Examiner—Stevan A. Resan
(74) Attorney, Agent, or Firm—Sonnenschein, Nath & Rosenthal LLP (57) ABSTRACT

A magnetic disk with an embossed pattern is provided. The disk comprises a magnetic film formed on a substrate provided with an erose embossed pattern on a surface along a circumferential direction, said embossed pattern having an upper surface, a lower surface, and a inclined portion or a vertical portion between the upper surface and the lower surface. In the disk, at least the magnetic film in the inclined portion or the vertical portion of the embossed pattern is magnetized, the direction of said magnetization in the magnetic film in the inclined portion or the vertical portion in cross section in the circumferential direction of the magnetic disk is substantially parallel with a film surface of the magnetic film, and said magnetic film in the inclined portion or the vertical portion has a magnetization reversal area.

3 Claims, 9 Drawing Sheets

FIG. 2

EXAMPLE OF MANUFACTURING STEP OF MAGNETIC DISK WITH EMBOSSED PATTERN (FOR PLASTIC DISK)

FIG. 3

FLOW FOR MAGNETIZING MAGNETIC DISK WITH DMBOSSED PATTERN

RELATIONSHIP BETWEEN SECONDWRY MAGNETIZATION CURRENT AND AMPLITUDE/TIME INTERVAL

MAGNETIC DISK WITH EMBOSSED PATTERN

CROSS REFERENCES TO RELATED APPLICATIONS

The present document is based on Japanese Priority Document JP 2001-207611, filed in the Japanese Patent Office on Jul. 9, 2001, the entire contents of which being incorporated herein by reference.

BACKGROUND OF THE INVENTION

1. Field of the Invention

The present invention relates to a magnetic disk having an embossed pattern for reproducing a servo position signal or ROM data.

2. Description of the Related Art

For magnetic disks, a servo position signal is written into every completed disk to realize precise head positioning for a higher track density. The writing of the servo position signal requires head feed while accurate positioning is performed with a pitch equal to a fraction of an intended track pitch. This needs a servo track writer provided with an extremely accurate positioning mechanism and a process taking a long processing time for writing. Thus, the above method requires higher accuracy and a longer processing time as the track density is higher, which causes an increase in manufacturing cost of the magnetic disks.

As a means for solving the aforementioned problem, a proposed magnetic disk with an embossed pattern has a servo pattern previously formed thereon as projections and depressions in a substrate. This type of disk requires magnetizing operation for obtaining a reproduced signal from the embossed pattern. The magnetizing operation, however, does not need positioning, and the accuracy of the servo pattern is determined by the accuracy of a matrix used in forming the embossing, so that a more accurate servo pattern can be formed readily and simply in a short time.

Figure 10:
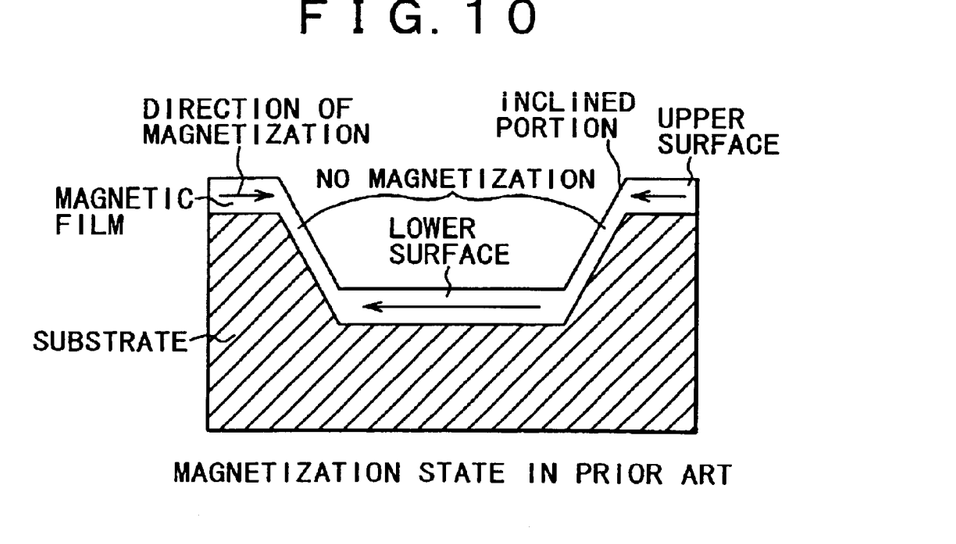
FIG. 10 shows a magnetization state in a conventional magnetic disk with an embossed pattern.

In this case, as an example of the aforementioned magnetic disk with an embossed pattern, proposed is a magnetic disk having a magnetic film on an upper surface of an embossed pattern and a magnetic film on a lower surface of the embossed pattern such that the magnetic films are magnetized in opposite directions as shown in FIG. 10 (JP Patent Number No. 2831078). Specifically, in the magnetic disk, two types of heads with different gap lengths are used, and the magnetic films on the upper and lower surfaces of the embossed pattern are first simultaneously magnetized in the same direction by the head with a larger gap length, and then only the magnetization of the magnetic film on the upper surface is reversed in the opposite direction by the head with a smaller gap length.

SUMMARY OF THE INVENTION

As described above, the magnetic disk in JP Patent Number No. 2831078 has the opposite directions of magnetization in the upper and lower surfaces of the embossed pattern. In this case, in the above magnetic disk, an inclined portion between the upper surface and the lower surface of the embossed pattern is in a demagnetized state or a magnetization transition area in which the direction of magnetization is unfixed.

According to studies of the present inventors, however, the magnetic disk in JP Patent Number No. 2831078 fails to form a favorable reproduced signal from the embossed pattern. For example, when the inclined portion is in a demagnetized state (without magnetization) as shown in FIG. 10, magnetization is present independently in the upper surface and the lower surface and no signal is produced from the inclined portion. Thus, a reproduced signal produced from magnetization caused in the lower surface involves spacing loss with respect to a reproduced signal produced from magnetization caused in the upper surface due to the distance in a depth direction of the embossed pattern, so that high quality cannot be expected in the resulting reproduced signal obtained by combining those signals.

The present invention has been made in view of the aforementioned circumstances, and it is desirable thereof to provide a magnetic disk with an embossed pattern capable of producing a favorable reproduced signal from the embossed pattern.

As a result of various studies for achieving the aforementioned aspect, the inventors of the present invention found that, in a magnetic disk with an embossed pattern, magnetization is given to a magnetic film in an inclined portion or a vertical portion between an upper surface and a lower surface of the embossed pattern such that the direction of the magnetization in cross section along the circumferential direction of the magnetic disk is parallel with the magnetic film, and a magnetization reversal area is formed in the magnetic film in the inclined portion or the vertical portion, thereby making it possible to form a favorable reproduced signal from the embossed pattern. In other words, the present inventors found that a favorable reproduce signal is not obtained simply from different directions of magnetization in the upper surface and the lower surface of the embossed pattern but the directions of magnetization and magnetization reversal in the inclined portion or the vertical portion of the embossed pattern contribute to output of a reproduced signal, and a favorable reproduced signal may be obtained by controlling the directions of magnetization and the magnetization reversal in the inclined portion or the vertical portion.

The present invention has been made on the basis of the aforementioned findings, and provides a magnetic disk with an embossed pattern having a magnetic film formed on a substrate provided with an erose embossed pattern on a surface along a circumferential direction, the embossed pattern having an upper surface, a lower surface, and a inclined portion or a vertical portion between the upper surface and the lower surface, wherein at least the magnetic film in the inclined portion or the vertical portion of the embossed pattern is magnetized, the direction of the magnetization in the magnetic film in the inclined portion or the vertical portion in cross section in the circumferential direction of the magnetic disk is substantially parallel with the film surface of the magnetic film, and the magnetic film in the inclined portion or the vertical portion has a magnetization reversal area.

In this manner, the magnetic disk with the embossed pattern according to the present invention can form a favorable reproduced signal from the embossed pattern.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DESCRIPTION OF THE PREFERRED EMBODIMENT

Figure 1:
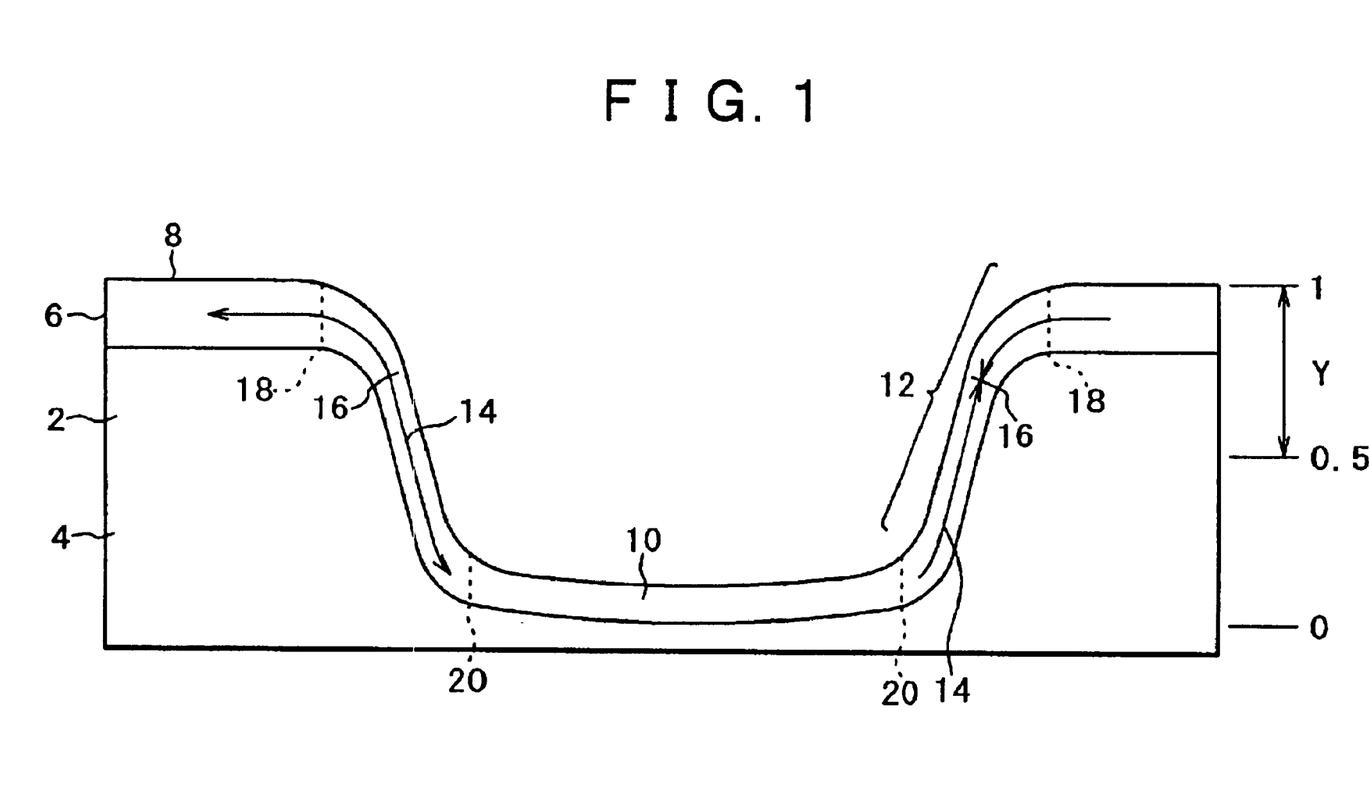
FIG. 1 is a conceptual diagram showing an example of an embossed pattern in a magnetic disk with an embossed pattern according to the present invention.

An embodiment of the present invention will hereinafter be described. Several techniques are contemplated for forming an embossed pattern on a disk substrate, such as formation through injection molding using a plastic material and processing of a typical substrate through etching or the like. In any case, the formed embossed pattern usually does not have an ideal sectional form and has an upper surface, a lower surface, and an inclined portion between the upper surface and the lower surface as shown in FIG. 1.

To obtain a favorable reproduced signal from the embossed pattern, it is important to control the direction of magnetization and magnetization reversal in a magnetic film in the inclined portion rather the relationship between directions of magnetization in magnetic films on the upper surface and the lower surface. Specifically, to obtain a favorable reproduced signal from the embossed pattern, the following requirements must be satisfied in a magnetic disk with an embossed pattern having a magnetic film 6 formed on a substrate 4 provided with an erose embossed pattern 2 on its surface along a circumferential direction:

(1) magnetization 14 is present in the magnetic film 6 in an inclined portion 12 between an upper surface 8 and a lower surface 10 of the embossed pattern 2;

(2) the direction of the magnetization 14 of the magnetic film 6 in the inclined portion 12 in cross section in the circumferential direction of the magnetic disk (arrows in the figures indicate the directions of magnetization) is substantially parallel with the film surface of the magnetic film 6; and (3) magnetization reversal areas 16 are present in the magnetic film 6 in the inclined portion 12.

The upper surface 8 of the embossed pattern 2 refers to a substantially flat portion on the top of the projection, while the lower surface 10 of the embossed pattern 2 refers to a substantially flat portion on the bottom of the depression. The magnetic film in the inclined portion 12 of the embossed pattern 2 refers to the magnetic film present between an edge 18 of the magnetic film on the upper surface 8 of the embossed pattern 2 and an edge 20 of the magnetic film on the lower surface 10. In addition, the magnetization reversal areas 16 refer to a magnetization direction transition area (the magnetization reversal area 16 on the right in FIG. 1) in which opposite directions of magnetization abut each other, and a magnetization direction transition area (the magnetization reversal area 16 on the left in FIG. 1) in which opposite directions of magnetization are produced.

Figure 2:
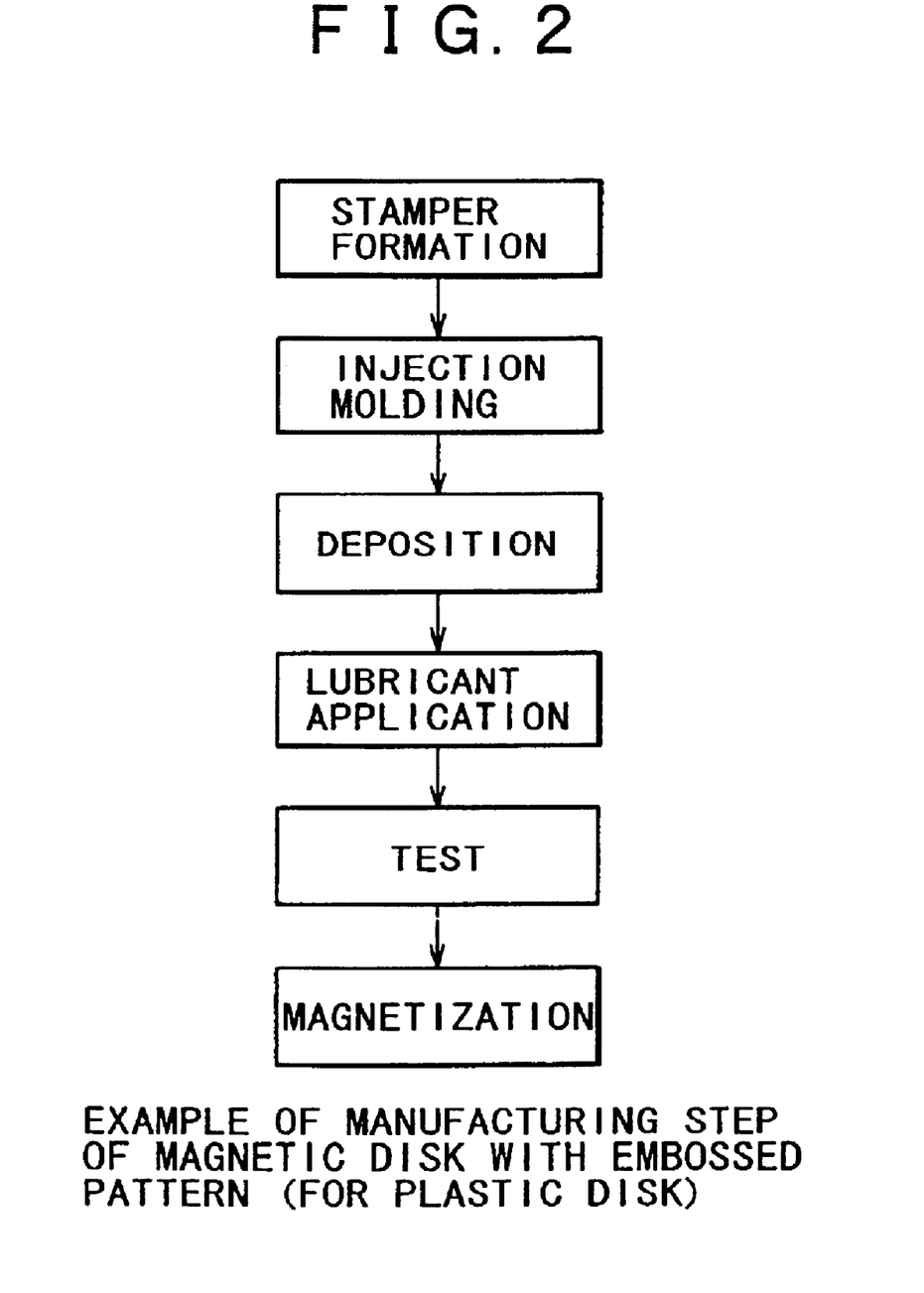
FIG. 2 shows an example of the manufacturing process of the magnetic disk with an embossed pattern.
Figure 3:
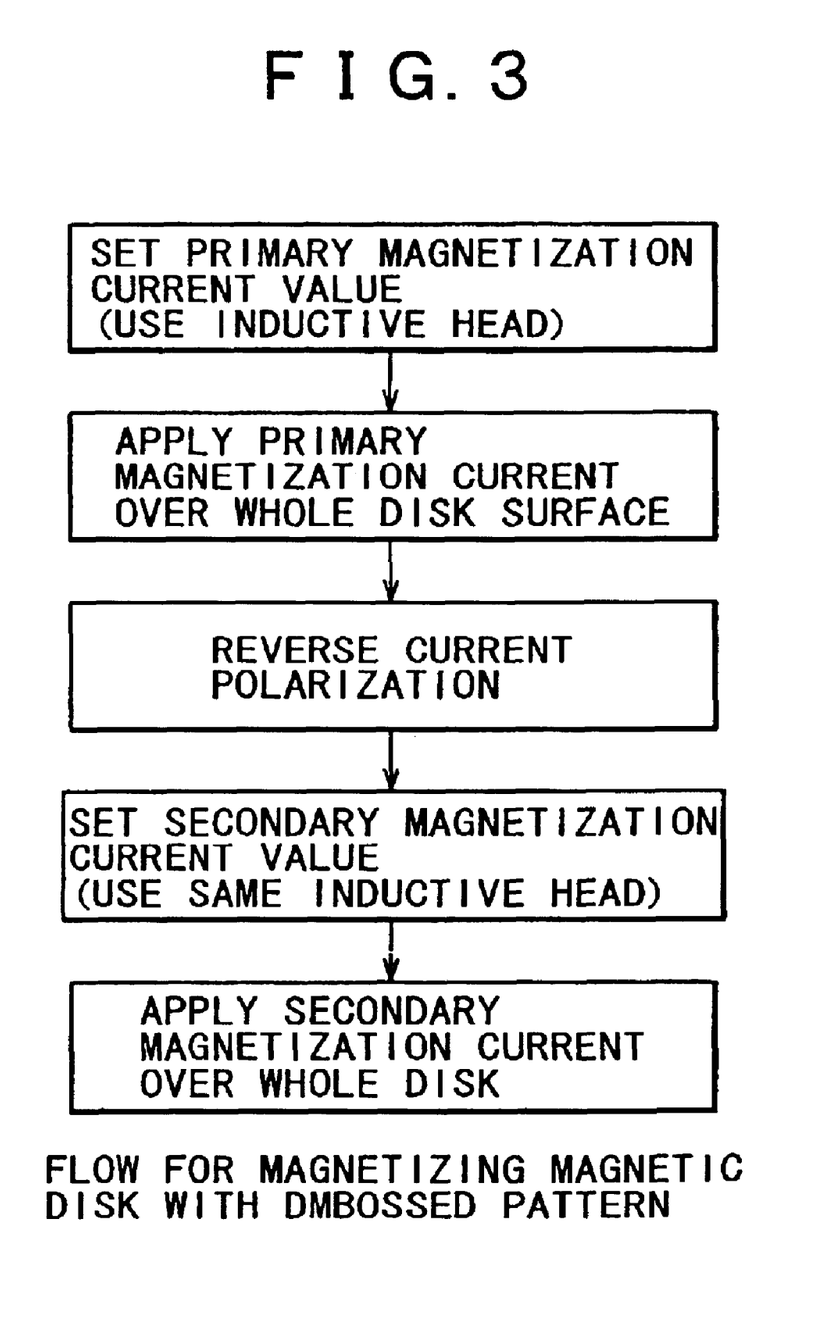
FIG. 3 shows an example of a magnetizing flow for the magnetic disk with an embossed pattern.

The technique of realizing the aforementioned disk is described below. FIG. 2 shows an example of the manufacturing process of the magnetic disk with an embossed pattern. In this example, the disk substrate is formed through injection molding of a plastic material. A magnetic film is deposited through sputtering or the like on the disk substrate formed through the injection molding using a stamper, and after a protection film forming step and a lubricant applying step are performed similarly to those performed on a typical magnetic disk, the disk is completed. It should be noted that the embossed pattern can be formed not only as a servo signal pattern but also as a data signal pattern, in which case the embossed pattern serves as ROM data. The completed disk is subjected to quality tests such as a glide height test and an error test, as required, similar to those performed on a magnetic disk. Magnetizing operation for obtaining a signal from the embossed pattern is performed on a disk which has been determined to have no problems.

The magnetizing operation is performed by passing DC current through a head winding using a head of one type. In this event, two steps of primary magnetizing and secondary magnetizing are employed. The primary magnetizing uses a sufficiently large current value, while the secondary magnetizing uses a relatively small current value. The primary magnetizing current and the secondary magnetizing current are set to have opposite directions. Since signal quality depends on the value of the secondary magnetizing current, the current value must be optimized.

Figure 4:
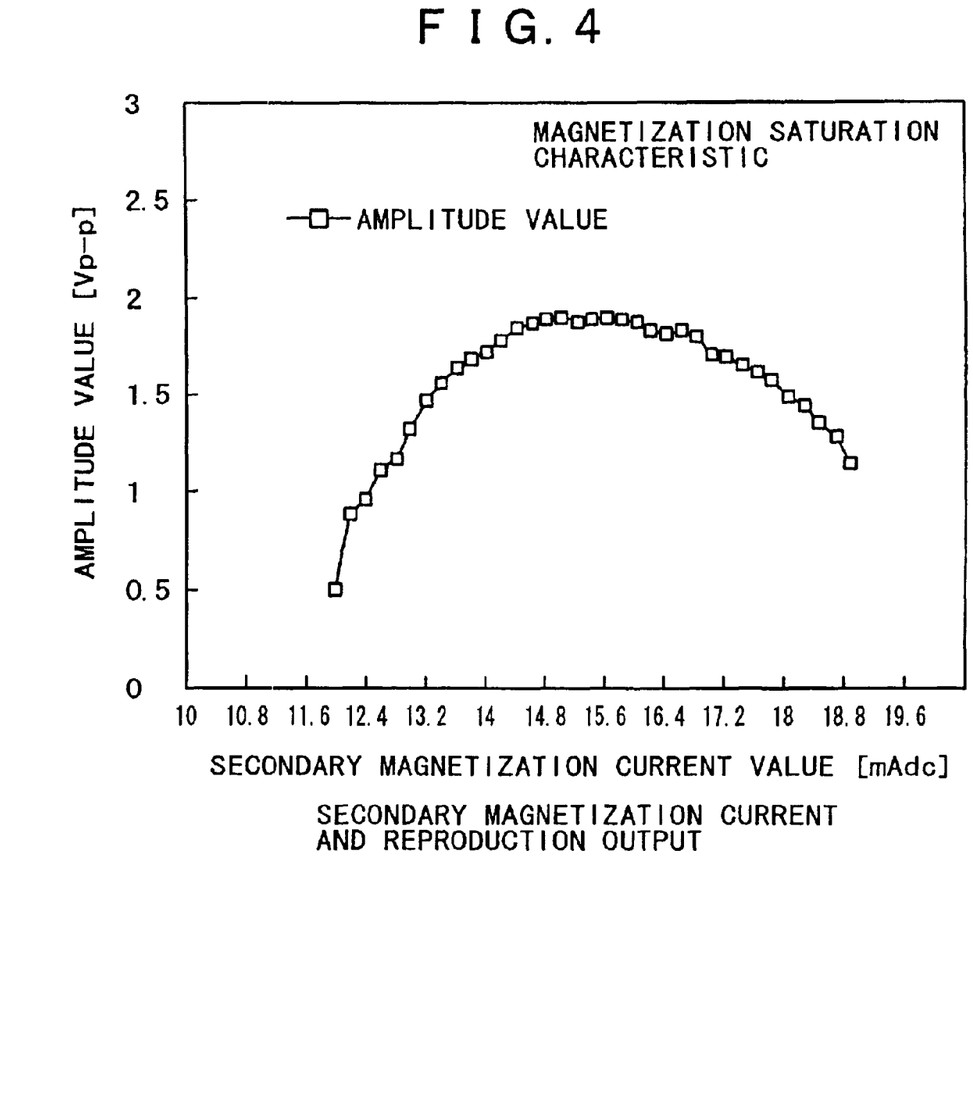
FIG. 4 is a graph showing an example of the relationship between a secondary magnetizing current and reproduction output in the magnetic disk with an embossed pattern.

FIG. 4 shows a graph of an exemplary relationship between the secondary magnetizing current and reproduction output. The magnetizing head had a floating amount of 15 nm and a gap length of 0.3 $\mu$m. The primary magnetizing current had a sufficiently large value of 50 mA. The embossed pattern had a depth of 45 nm and the magnetic film had an Hc value of 3,200 Oe. The substrate was formed by using a plastic material through the injection molding as described above. As shown in FIG. 4, while the reproduction output is increased up to a certain point as the secondary magnetizing current value is increased, the output is gradually attenuated as the secondary magnetizing current value is further increased above a peak level.

Figure 5A:
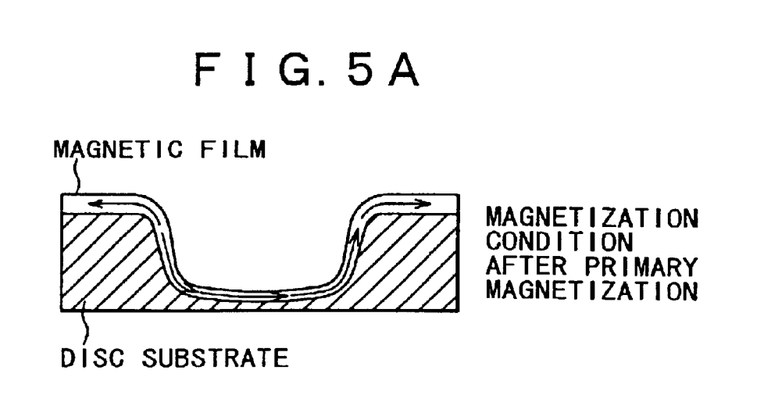
FIGS. 5A and 5B show a process of producing magnetization reversal by magnetizing in the magnetic disk with an embossed pattern.
Figure 5B:
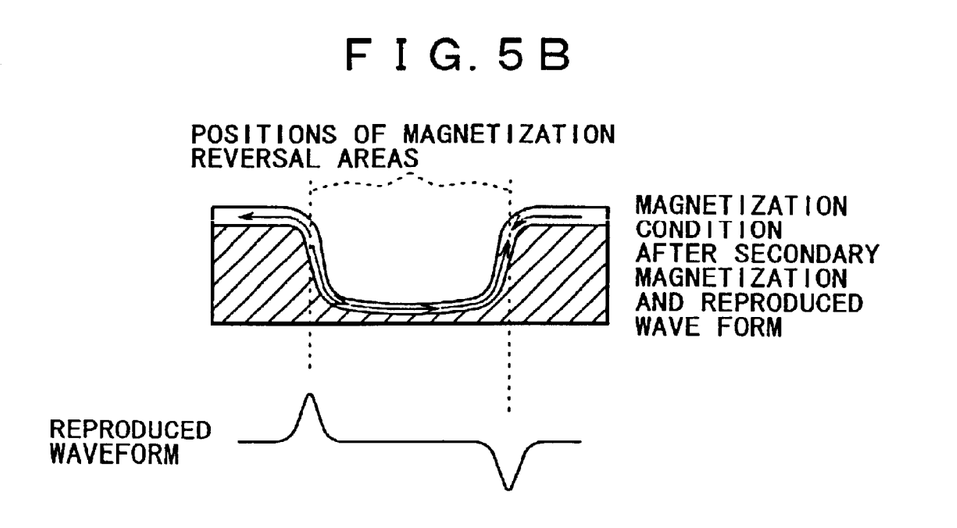

It is presumed that the principles behind the reproduction output observed from the embossed pattern are as follows (see FIG. 5). A magnetic field produced by the secondary magnetizing in the opposite direction to the direction of the primary magnetization produced by the primary magnetizing serves to reverse the direction of the primary magnetization. However, the presence of the embossed pattern causes an influence of the magnetic field distribution in the depth direction to produce an area in which a sufficient magnetic field strength can be obtained to reverse the direction of the magnetization in the inclined portion of the embossed pattern and an area in which such a strength cannot be obtained. Thus, the inclined portion of the embossed pattern includes a portion in which magnetization reversal occurs and a portion in which it does not occur, and the boundary between them serves as a magnetization reversal area. The magnetization reversal area is a magnetization direction transition area. The magnetization reversal area present in the inclined portion of the embossed pattern can produce a favorable reproduced signal.

The output is gradually attenuated as shown in FIG. 4 because the cross section of the formed embossed pattern does not realize an ideal pattern which has continuous horizontal and vertical surfaces. In other words, the cross section of the embossed pattern has the upper surface, the lower surface, and the inclined portion between them. The inclined portion is broadly divided into a portion gently sloping down from the upper surface, a portion steeply sloping down therefrom, and a portion gently sloping down to the lower surface. The inclined portion formed continuously from the upper surface to the lower surface in this manner causes the output attenuation shown in FIG. 4. Specifically, the output is high when the position of the occurrence of the magnetization reversal is close to the upper surface of the pattern, but the position of the occurrence of the magnetization reversal becomes lower along the inclined portion toward the lower surface as the secondary magnetizing current is increased. The reproduction output is thus reduced. As the secondary magnetizing current is further increased, the whole lower surface is finally magnetized, which is equivalent to the primary magnetizing performed in the opposite direction.

Figure 6A:
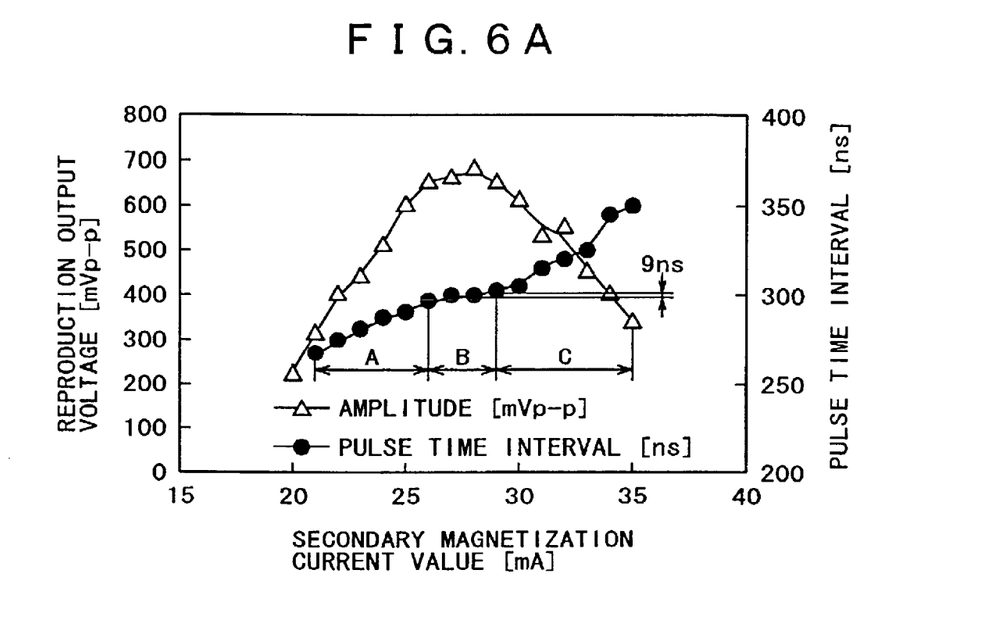
FIG. 6 shows an example of the relationship between the secondary magnetizing current and an amplitude/time interval in the magnetic disk with an embossed pattern.
Figure 6B:
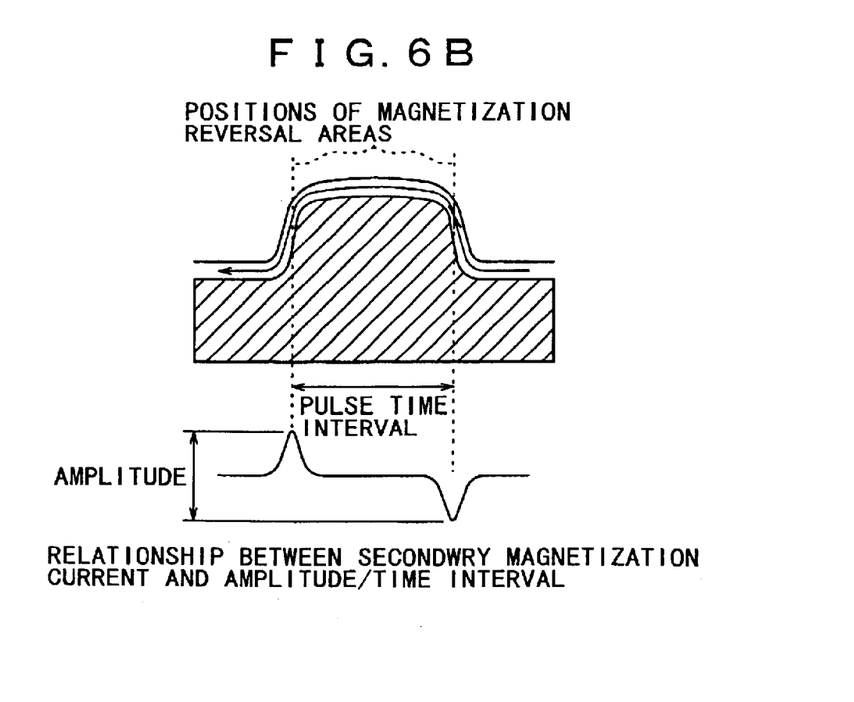

FIG. 6 shows an example of measurements of the foregoing from another viewpoint. In this example, not only amplitude values in reproduction but also time intervals in reproduced waveforms obtained from the magnetization reversal areas of the embossed pattern are shown with respect to the secondary magnetizing current value. In the measurements, the pattern depth was 200 nm, the Hc value of the magnetic film was 1,500 Oe, and the floating amount of the head was 50 nm. It can be seen from FIG. 6 that the pulse time interval between two magnetization reversal areas changes in accordance with a change in the reproduction output. In this example, the time interval largely changes in a range (A) in which the reproduction output is initially increased, and the time interval slightly changes in a range (B) in which a peak is reached, and the time interval again largely changes in an output attenuation range (C) after the peak. In the first output increase area, the magnetization reversal occurs near the upper surface of the embossed pattern, and thus the time interval largely changes due to the gentle slope near the upper surface of the pattern. The output is at the maximum when the position of the magnetization reversal is moved lower in the inclined portion, but the time interval slightly changes since the inclined portion has a steep slope there. However, the output is rapidly attenuated as the position of the magnetization reversal is moved toward the lower surface. As the position of the magnetization reversal is further closer to the lower surface, the time interval again largely changes due to the gentle slope near the lower surface of the pattern.

Since the aforementioned results in FIG. 6 depend on the head, the disk, and the pattern shape used in the experiment, the steep slope is not necessarily an optimal point for the magnetization reversal. The position of the magnetization reversal at which the output is at the maximum needs to be actually measured and determined as occasion demands in a system employing the head, the disk, and the pattern shape. However, it is clear from the aforementioned results that the inclined portion has an important meaning as the position of the magnetization reversal. In addition, it can be seen from the aforementioned results that the magnetization reversal can be produced in the inclined portion to obtain the optimal magnetization state by measuring the relationship between the secondary magnetizing current and the reproduction output and determining the value of the secondary magnetizing current.

Figure 7A:
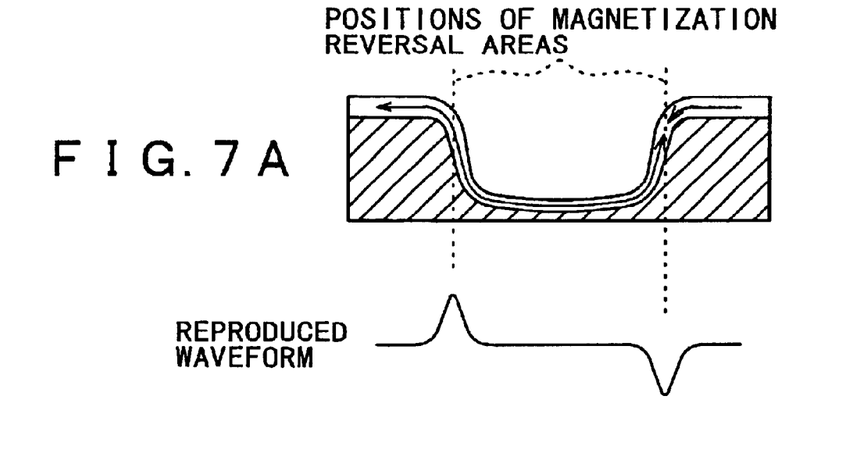
FIGS. 7A, 7B, and 7C show examples of magnetization states in which magnetization reversal is produced in an inclined portion of the magnetic disk with embossed pattern.
Figure 7B:
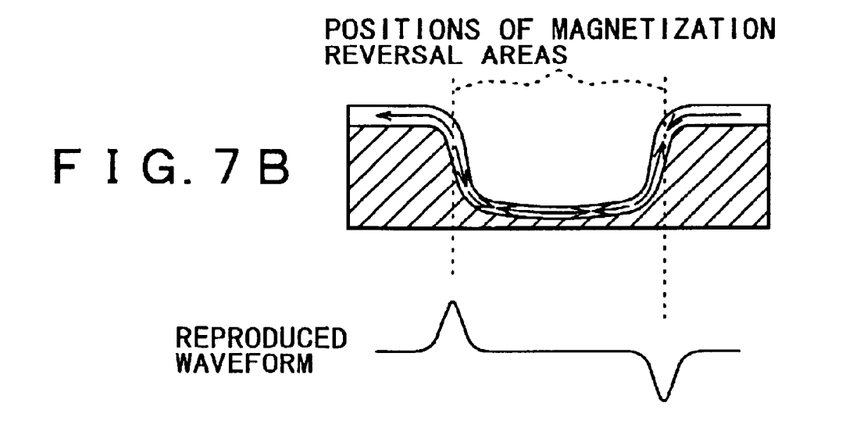
Figure 7C:
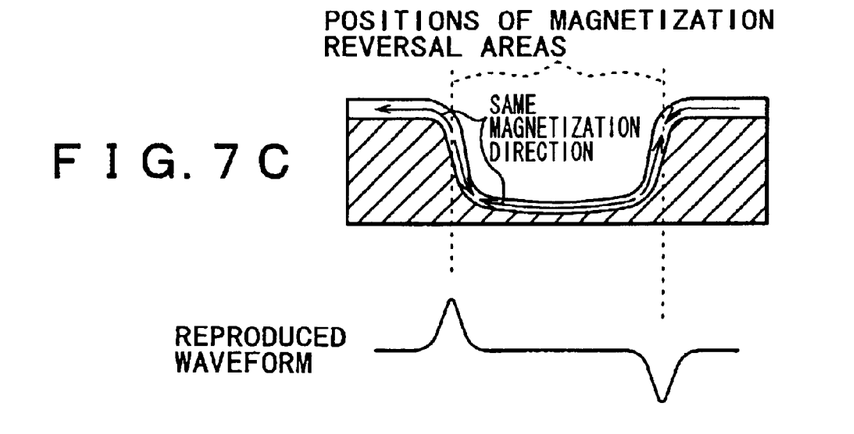

FIG. 7 shows examples of the magnetization state in which the magnetization reversal is produced in the inclined portion. In the example of FIG. 7A, the magnetic films in the inclined portion and on the lower surface of the embossed pattern are collectively magnetized in the same direction, and the magnetic film on the upper surface is magnetized in the opposite direction. The magnetization reversal area may be present extremely near the boundary between the upper surface and the inclined portion or at other portions in the inclined portion. In the example of FIG. 7B, magnetization in a certain direction is not positively given to the magnetic film on the lower surface, and magnetization in a certain direction is given to the magnetic films in the inclined portion and on the upper surface. The magnetization reversal area may be present extremely near the boundary between the upper surface and the inclined portion or at other positions in the inclined portion. The magnetization state as FIG. 7B can be obtained by previously performing demagnetization and then performing magnetizing operation. In this case, the primary magnetizing current may be set to a level such that it does not influence the lower surface. In the example of FIG. 7C, the direction of magnetization in the magnetic film on the lower surface is the same as the direction of magnetization in the magnetic film on the upper surface. The magnetization reversal area may be present extremely near the boundary between the upper surface and the inclined portion or at other positions in the inclined portion. The magnetization state as FIG. 7C can be obtained by simultaneously magnetizing the magnetic films on the upper surface, the lower surface, and the inclined portion in one direction with the primary magnetizing current and then passing the secondary magnetizing current for reversing the magnetization in the magnetic films on the upper surface and in the inclined portion, and passing a tertiary magnetizing current set to a value for reversing the magnetization in the magnetic film on the upper surface and part of the magnetic film in the inclined portion in order to provide magnetization in the same direction as the primary magnetizing current.

As apparent from the examples in FIG. 7, the direction of the magnetization in the lower surface of the embossed pattern need not be opposite to the direction of the magnetization in the upper surface of the embossed pattern and may be set arbitrarily. What is most important is to control the directions of the magnetization such that the magnetization reversal is produced in the inclined portion of the embossed pattern. In contrast, the conventionally proposed magnetizing method in which the directions of the magnetization in the upper surface and the lower surface are opposite to each other does not involve magnetization reversal in the inclined portion. In such a conventional magnetizing state, it is contemplated that proper reproduction output is difficult to obtain. In addition, since magnetizing is difficult to perform without leaving magnetization in the inclined portion, it is conceivable that a favorable reproduced signal cannot be obtained only by the opposite directions of the magnetization in the upper surface and the lower surface.

Figure 8:
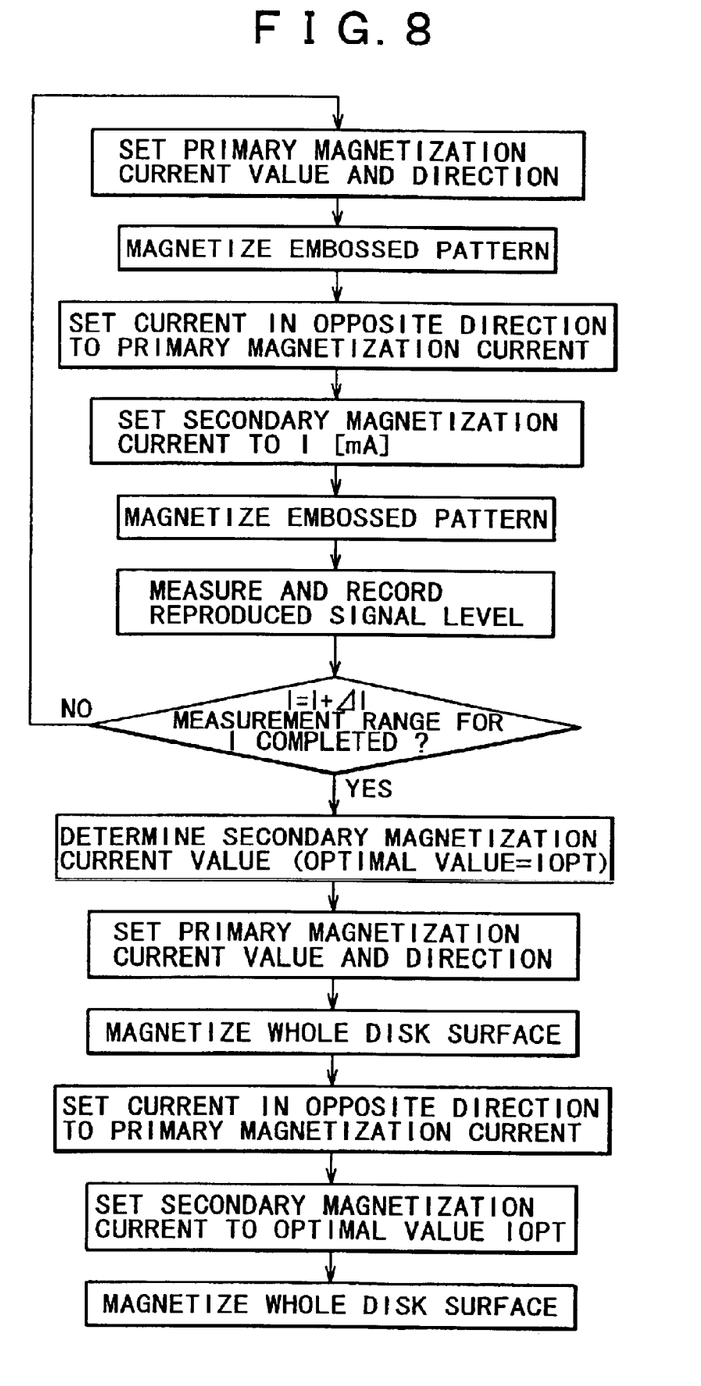
FIG. 8 shows an example of a flow for forming a magnetic disk with an embossed pattern in the optimal magnetization state.

From the foregoing, a flow for determining conditions required for producing the magnetization reversal at an appropriate position in the inclined portion of the embossed pattern to obtain the optimal magnetization state is as shown in FIG. 8. The primary magnetizing current is set to a large value for allowing a sufficiently large head magnetic field to be produced for the Hc of the disk, and with this value, the secondary magnetizing current is changed to determine the conditions for achieving the optimal magnetizing state. Under such conditions determined in this manner, the magnetizing state can be obtained with the magnetization reversal present in the inclined portion of the embossed pattern. The whole disk surface may be magnetized in this state to achieve the optimal magnetizing state over the whole disk surface. Since the whole disk surface does not necessarily have uniform magnetizing conditions, the disk surface is divided into zones and the optimal conditions are determined for each of the zones, thereby realizing a more satisfactory magnetizing state.

Figure 9:
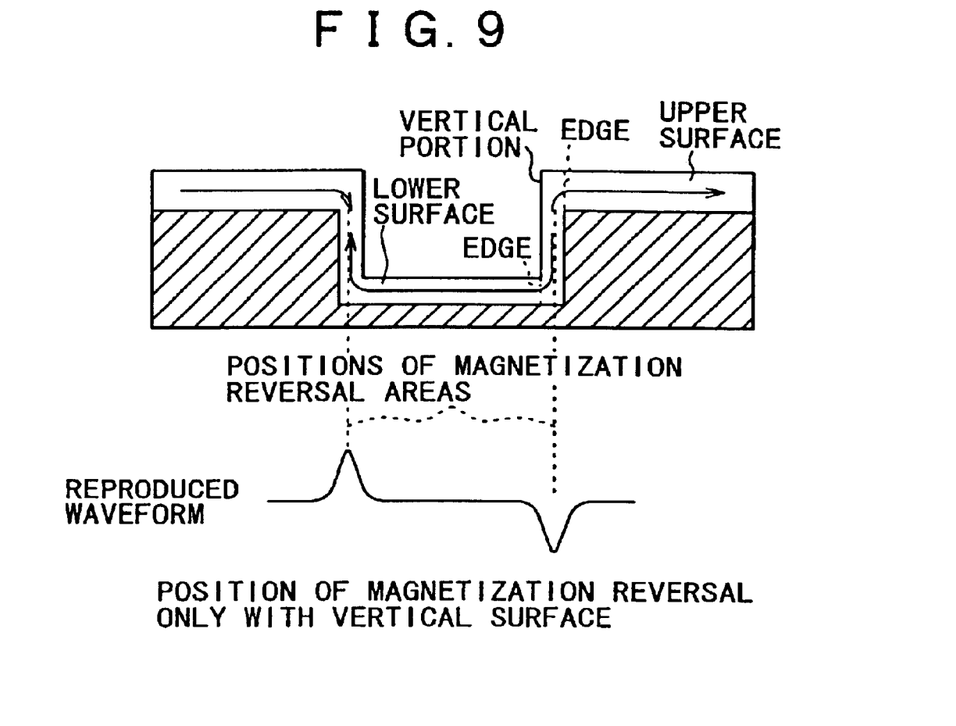
FIG. 9 shows magnetization reversal in a vertical portion of a magnetic disk with an embossed pattern.

Up to this point, description has been made for the case where the embossed pattern consists of the upper surface, the loser surface, and the inclined portion. This is the case of the embossed pattern being actually formed through the injection molding or the like, but the description applies to a case where an ideal embossed pattern can be realized by a certain technique. For example, when the portion between an upper surface and a lower surface is exactly vertical, the resulting configuration is as shown in FIG. 9. Even when the portion between the upper surface and the lower surface is exactly vertical, it is conceivable that a magnetic film is also present on the vertical surface after deposition. Thus, the optimal magnetization state is a state in which a magnetization reversal area is present in the magnetic film in the vertical portion. The magnetic film in the vertical portion refers to the magnetic film present between the edge of the magnetic film on the upper surface of the embossed pattern and the edge of the magnetic film on the lower surface.

As apparent from the foregoing, the magnetic disk with an embossed pattern according to the present invention includes, for example, specific embodiments as (1), (2):

(1) a magnetic disk with an embossed pattern in which magnetization is present in magnetic films on an upper surface and a lower surface of the embossed pattern, the directions of the magnetization in the magnetic films on the upper surface and the lower surface in cross section in the circumferential direction of the magnetic disk are substantially parallel with the film surface of the magnetic film, and the directions of the magnetization in the magnetic films on the upper surface and the lower surface are the same; and (2) a magnetic disk with an embossed pattern in which magnetization is present in magnetic films on an upper surface and a lower surface of the embossed pattern and the direction of the magnetization in one or both of the magnetic films on the upper surface and the lower surface is indefinite.

In addition, as apparent from the foregoing, in the magnetic disk with an embossed pattern according to the present invention, the magnetization reversal area is preferably present in the magnetic film in the inclined portion or the vertical portion closer to the upper surface. This can ensure a favorable reproduced signal from the embossed pattern. Specifically, as shown in FIG. 1, assuming that the level of the bottom of the magnetic film on the lower surface of the embossed pattern is 0 and the level of the top of the magnetic film on the upper surface of the embossed pattern is 1, the magnetization reversal area is appropriately present at a level in a range Y of 0.5 to 1 in the magnetic film in the inclined portion or the vertical portion.

With a higher recording density in a magnetic disk, a higher Hc of a magnetic film is needed. As the Hc is higher, a magnetizing head with higher output is required for magnetizing the lower surface of the embossed pattern involving significant spacing loss. However, the output requirement for the magnetizing head is more relaxed when magnetization reversal is produced in the inclined portion (or the vertical portion, the same holds true for the following) since spacing is not dependent on the depth of the embossed pattern. In conventional magnetizing, heads with different gap lengths are used to realize magnetizing in the upper surface and the lower surface of the embossed pattern. The magnetization reversal in the inclined portion of the embossed pattern, however, can be achieved by using the same head and different recording currents. In addition, the tendency toward a higher recording density of a magnetic disk leads to a narrower gap in a head suitable for short wavelength recording. The magnetizing head also employs a narrow gap to prevent the secondary magnetizing for magnetizing the upper surface of the embossed pattern from affecting the lower surface of the embossed pattern. While it is difficult for such a narrow gap head to magnetize the upper surface and the lower surface of the embossed pattern in different directions, it is relatively easy to produce the magnetization reversal in the inclined portion of the embossed pattern. Note that the magnetization reversal in the inclined portion of the embossed pattern may be realized by heads with different gap lengths.

What is claimed is:

1. A magnetic disk with an embossed pattern, comprising:
    a magnetic film formed on a substrate provided with an erose embossed pattern on a surface along a circumferential direction, said embossed pattern having an upper surface, a lower surface, and an inclined portion or a vertical portion between the upper surface and the lower surface, wherein:
    at least the magnetic film in the inclined portion of the vertical portion of the embossed pattern is magnetized, the direction of said magnetization in the magnetic film in the inclined portion or the vertical portion in cross section in the circumferential direction of the magnetic disk is substantially parallel with a film surface of the magnetic film, said magnetic film in the inclined portion or the vertical portion has a magnetization reversal area, and the magnetization reversal area is present in the magnetic film in the inclined portion or the vertical portion closer to the upper surface.

2. The magnetic disk with an embossed pattern according to claim 1, wherein
    the magnetic films on the upper surface and the lower surface of the embossed pattern have magnetization, the directions of said magnetization in the magnetic films on the upper surface and the lower surface in cross section in the circumferential direction of the magnetic disk are substantially parallel with the film surface of the magnetic film, and the directions of said magnetization in the magnetic films on the upper surface and the lower surface are the same.

3. The magnetic disk with an embossed pattern according to claim 1, wherein
    the magnetic films on the upper surface and the lower surface of the embossed have magnetization, and the direction of said magnetization in one or both of the magnetic films on the upper surface and the lower surface is unfixed.

* * * * *